United States Patent [19]

Yamada et al.

[11] Patent Number: 5,030,867
[45] Date of Patent: Jul. 9, 1991

[54] SAME POLARITY INDUCTION GENERATOR

[75] Inventors: Yasuharu Yamada, Chiba; Yasuo Kobayashi, Tokyo, both of Japan

[73] Assignee: Technical Associate Co., Ltd., Tokyo, Japan

[21] Appl. No.: 427,234

[22] Filed: Oct. 25, 1989

[30] Foreign Application Priority Data

Aug. 2, 1989 [JP] Japan .................................. 1-199302
Aug. 8, 1989 [JP] Japan .............................. 1-92567[U]
Aug. 8, 1989 [JP] Japan .................................. 1-203948

[51] Int. Cl.$^5$ ............................................ H02K 21/12
[52] U.S. Cl. ...................................... 310/156; 310/43; 310/114; 310/166; 310/180; 310/181
[58] Field of Search ............... 310/179, 180, 181, 184, 310/152, 166, 154, 168, 155, 171, 156, 179, 105, 114, 178, 261, 258, 254, 89, 43, 45

[56] References Cited

U.S. PATENT DOCUMENTS

| | | | |
|---|---|---|---|
| 3,320,660 | 5/1967 | Otto | 310/254 |
| 3,978,356 | 8/1976 | Spiesberger | 310/156 |
| 4,143,289 | 3/1979 | Williams | 310/156 |
| 4,445,061 | 4/1984 | Jackson, Jr. | 310/156 |
| 4,564,778 | 1/1986 | Yoshida | 310/181 |
| 4,619,588 | 10/1986 | Moore III | 310/154 |
| 4,837,468 | 6/1989 | Froment | 310/89 |

FOREIGN PATENT DOCUMENTS 62-45787 2/1987 Japan .
62-160061 7/1987 Japan .

Primary Examiner—R. Skudy
Attorney, Agent, or Firm—Flynn, Thiel, Boutell & Tanis

[57] ABSTRACT

The present invention discloses a same polarity induction generator comprising a casing, a stator composed of a plurality of magnetic poles spaced away at a predetermined mechanical angle, a rotary shaft, a rotor mounted on said rotary shaft and composed of two pairs of ferrite magnets each pair having one polarity located outwardly of a circumference of the rotor and the other polarity located inwardly of the circumference, the respective pairs being arranged so as to have different polarities on the outer circumference of the rotor, magnetic cores fixedly mounted on the casing, and coil wirings each wound around said respective magnetic cores so as to intersect magnetic fluxes formed among said ferrite magnets. The stator may be composed of two magnets fixedly mounted on said casing and located on both ends of said rotary shaft, each magnet including quartered, arched sub-magnets, the sub-magnets having magnetic poles of the same polarities located on an outer circumference of the stator which polarities are different from those of said ferrite magnets. The rotor may be located at the center of said casing and operatively connected to said rotary shaft, the rotor being configured with vane members located at both ends of the rotary shaft through a cylindrical member disposed therebetween and being made rotatable interiorly of said stator segmented sub-magnets.

7 Claims, 8 Drawing Sheets

SAME POLARITY INDUCTION GENERATOR

BACKGROUND OF THE INVENTION

1. Field of the Invention

The present invention relates to a same polarity induction generator capable of effectively producing electric power and of reducing the torque thereof.

2. Description of the Related Art

Generators are hitherto constructed to permit N and S poles thereof to be alternately operated, typically. This produces reactive magnetic force, resulting in an electromotive force including many higher harmonic components followed by much loss among other losses such as copper winding and iron loss, etc.

Japanese patent publication No. 62-45787 discloses, as illustrated in FIG. 6, of that publication, one type of such a same polarity induction generator. The generator comprises a stator composed of a plurality of magnetic cores disposed on one circumference and spaced in succession away at an equal mechanical angle (at a particular electrical angle of 180°), a rotor composed of a plurality of ferrite permanent magnets disposed on one circumference at the same angle as that of the aforementioned magnetic poles in an interlacing relation with respect to the latter, the magnets having their same polarities respectively on the outer and inner circumferences of the rotor, and coil windings wound around the magnetic cores, where magnetic densities are increased and decreased owing to and in synchronism with the rotation of the rotor, so as to intersect magnetic fluxes from the rotor, whereby a magnetic path is formed utilizing the same polarity poles, permitting the generator to be operated only with the same polarities.

The prior generator however has some drawbacks in that the magnetic fluxes are weakened because the magnetic paths 32 and 33 have a considerable length and the structure is very complicated requiring a large space and making manufacture thereof difficult.

Japanese Patent Laid-Open Publication No. 62-160061 discloses further another type of such generators wherein there is provided a structure for producing magnetic repulsive force between a stator and a rotor to assure a generator of reduced holding torque without having a bad influence upon generating operation of the device.

However, the generator of the type described above also suffers from drawbacks in that it is difficult to realize effective power generation, it is large-sized, and not easily manufactured, because it is a rotating magnet type.

SUMMARY OF THE INVENTION

In view of the drawbacks of the prior generators, it is an object of the present invention to provide same polarity induction generators capable of generating electricity only with the same polarities with a simplified compact structure.

Another object of the present invention is to provide a same polarity induction generator operative with high efficiency, the generator being capable of being manufactured as a large-sized permanent magnet type generator.

In one embodiment of the present invention, a same polarity induction generator comprises a casing, a stator composed of a plurality of magnetic cores fixedly mounted on the casing and spaced away at a predetermined mechanical angle from one another, a rotary shaft, a rotor mounted on said rotary shaft and composed of two pairs of ferrite magnets each pair having one polarity located along the outer circumference of the rotor and the other polarity located inwardly of the outer circumference, the respective pairs being arranged so as to have different polarities on the outer circumference of the rotor, and coil windings each wound around said respective magnetic cores so as to intersect magnetic fluxes produced by said ferrite magnets.

In another aspect of the present invention, a same polarity induction generator comprises a casing; a rotary shaft fixedly mounted on said casing; a rotor composed of a pair of ferrite magnets having magnetic poles of the same polarity located on an outer circumference of the rotor, the rotor being located at the center of said rotary shaft, a stator composed of two magnets fixedly mounted on said casing and located on both ends of said rotary shaft, each magnet including quartered, arched submagnets, the sub-magnets having magnetic poles of the same polarities located on an outer circumference of the stator which polarities are different from those of said ferrite magnets, magnetic cores fixedly mounted on said casing and having magnetic poles spaced away on a circumference at a predetermined mechanical angle, and coil windings wound around said magnetic cores so as to intersect magnetic fluxes formed from said ferrite magnets to the stator magnets.

In still another aspect of the present invention, a same polarity induction generator comprises a casing, a driving shaft, a stator composed of a pair of segmented sub-magnets fixedly, at both ends of the generator, mounted on said casing, each pair of segmented sub-magnets having magnetic poles of the same polarity which is different from that of the other pair, the segmented sub-magnets of each pair being located on the same circumference and spaced away at an angle of a predetermined range, a magnetic rotor located at the center of said casing and operatively connected to said rotary shaft, the rotor being configured with vane members located at both ends of the rotary shaft through a cylindrical member disposed therebetween and being made rotatable interiorly of said stator segmented sub-magnets, mounting frames fixedly mounted on said casing, and coil windings each wound around said mounting frames so as to intersect magnetic fluxes effluent from said stator through said rotor.

The above and other objects, features and advantages of the present invention will become more apparent from the following description when taken in conjunction with the accomanying drawings in which preferred embodiments of the present invention are shown by way of illustrative example.

BRIEF DESCRIPTION OF THE DRAWINS

DESCRIPTION OF THE PREFERRED EMBODIMENT

In what follows, preferred embodiments of a same polarity induction generator according to the present invention will be described with reference to the accompanying drawings.

Figure 1:
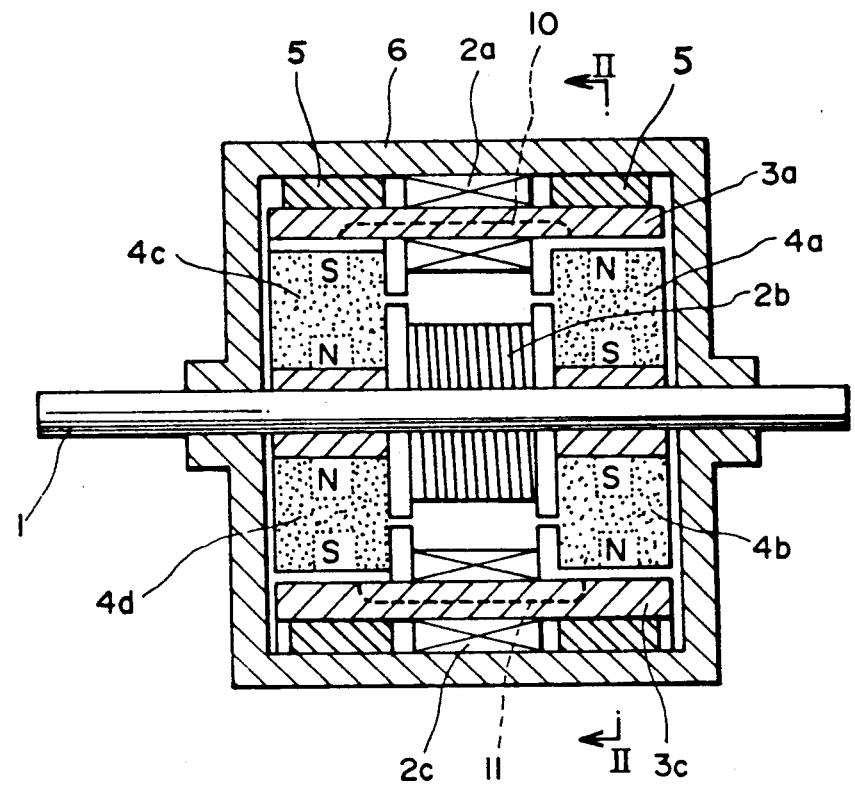
FIG. 1 is a side elevational view, cut away longitudinally in part, illustrating a first preferred embodiment in accordance with one aspect of the present invention.
Figure 2:
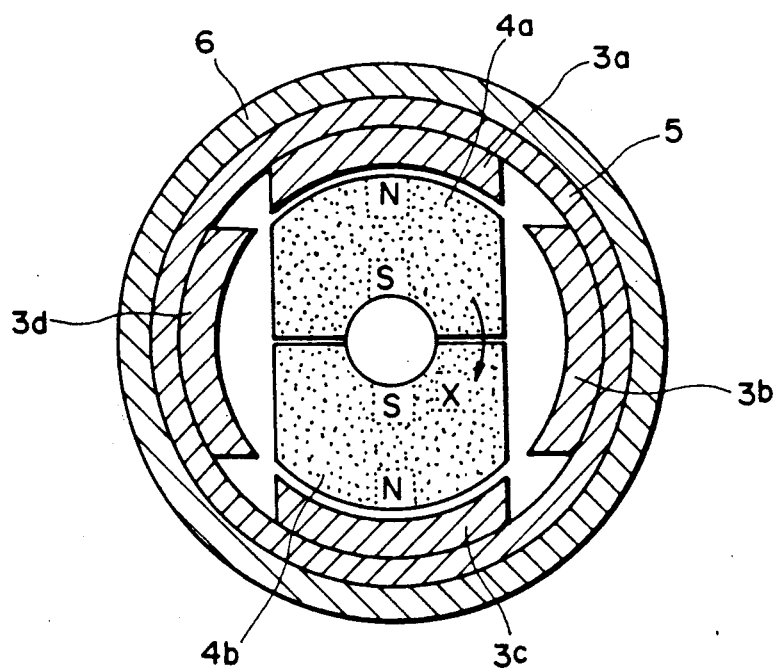
FIG. 2 is a cross-sectional view taken along a line II—II in FIG. 1.
Figure 5:
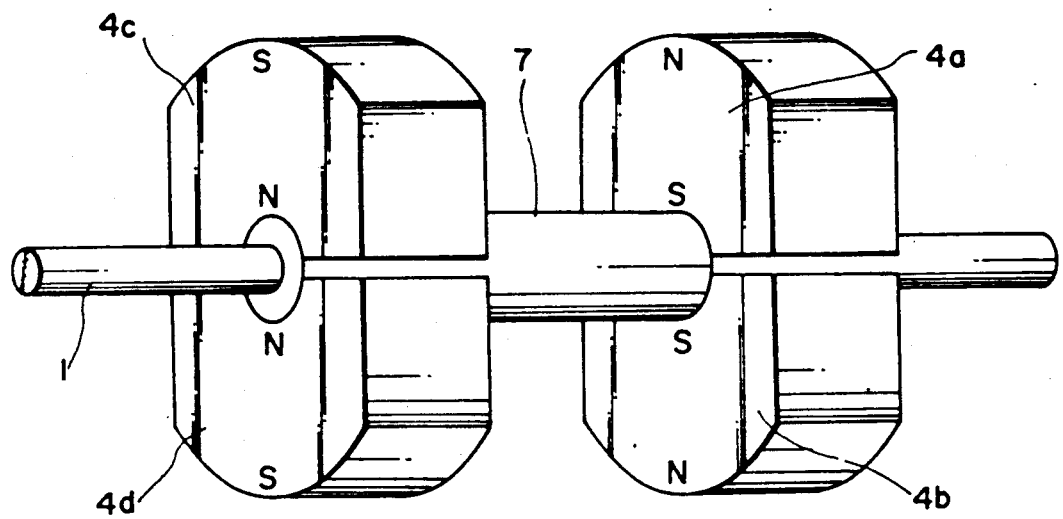
FIG. 5 is a perspective view illustrating rotating magnets and magnetic poles, etc., shown in FIGS. 1 and 2.

Referring first to FIGS. 1 and 2, an arrangement of the first preferred embodiment is illustrated in a side elevational view. As shown in the figures two pairs of ferrite magnets 4a, 4b, and 4c, 4d are fixedly mounted on and axially spaced from each other along a non-magnetic driving shaft 1. The pair of the magnets 4a, 4b, each being circular arc-shaped along the circumferential convex surface thereof over a mechanical angle of about 90°, and each having an N pole located along the outer circumferential surface, are fixedly mounted on the non-magnetic driving shaft 1 facing each other, while the ferrite magnets 4c, 4d, each being shaped simlarly to the magnets 4a, 4b and, oppositely to magnets 4a, 4b having a pole S located along the outer circumferential surface, are also fixedly mounted on the driving shaft 1. A plastic spacer 7 is located between those pairs of ferrite magnets. The rotor is constructed from the ferrite magnets 4a through 4d and the spacer 7, as best illustrated in FIG. 5.

Magnetic cores 3a through 3d which are physically and magnetically separate from each other and also are circumferentially spaced from each other and are fixedly mounted on a non-magnetic mounting frame 5. Each core has a concave inner surface and includes a cutaway 8 formed therein at the center thereof. Coil windings 2a through 2d are wound around each of the respective cores 3a through 3d between the magnet pairs along each of the cutaways 8. Those members constitute a stator, as illustrated in FIG. 6.

Figure 6:
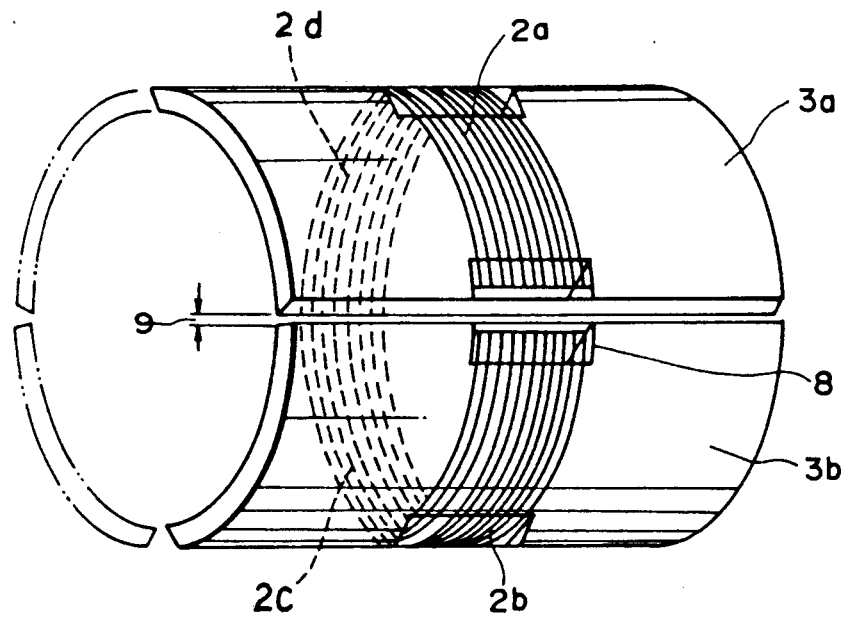
FIG. 6 is a perspective view illustrating cores shown in FIGS. 1 and 2.

The magnetic cores 3a through 3d, each having a mechanical angle of 90°, are separated away from each other by a distance 9 as illustrated in FIG. 6. Referring to FIG. 1, the magnetic cores 3a–3d each extend axially between and axially overlap both pairs of magnets.

An assembly composed, as described above, of the stator, the two pairs of the ferrite magnets, and the coil windings is housed in a casing 6. The resulting assembly assures a same polarity induction generator structured in a very simplified construction.

Operation of the first embodiment configured as described above is as follows.

As, illustrated in FIGS. 1 and 2, magnetic fluxes from the poles N of the rotor magnets 4a, 4b reach the poles S of the other rotor magnets 4c, 4d through the cores 3a, 3c, respectively. Those magnetic fluxes intersect the coil windings 2a, 2c, respectively.

Figure 3:
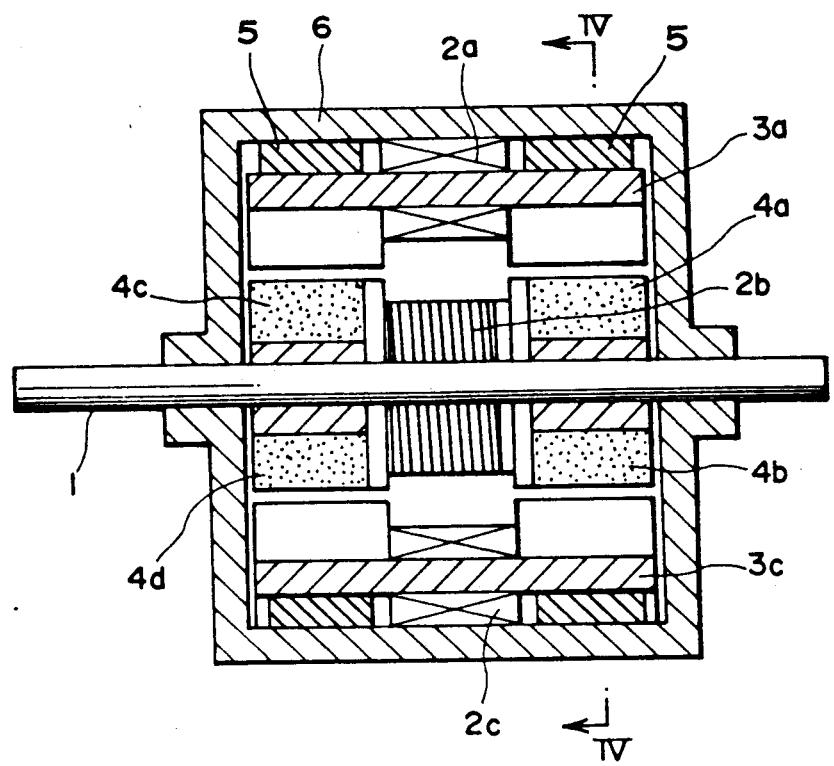
FIG. 3 is a side elevational view, taken longitudinally in part, illustrating the first preferred embodiment of FIG. 1 which is here in another situation of operation.
Figure 4:
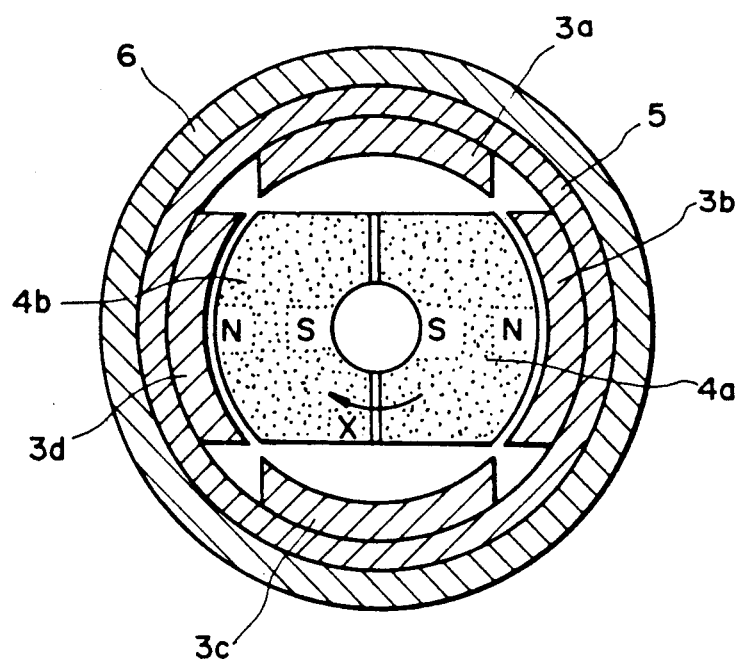
FIG. 4 is a cross-sectional view taken along a line IV—IV of FIG. 3.

As the rotor is rotated in the direction of arrow X shown in FIG. 2 the magnets fixedly mounted on the driving shaft 1 leave the cores 3a, 3c and enter the cores 3b, 3d, respectively, as illustrated in FIGS. 3 and 4. The convex outer surfaces of the magnets are shaped complimentary to the concave inner surfaces of the cores and have approximately the same circumferential dimensions. The cores and magnets have respective radial dimensions which permit the convex magnet surfaces to periodically move into closely radially adjacent relationship with each of the concave core surfaces during the rotation.

It should be understood here that the magnetic fluxes from the poles N of the rotor magnets 4a, 4b reach the poles S of the rotor magnets 4c, 4d through the cores 3b, 3d, to form magnetic paths similar to those shown at 10, 11 in FIG. 1. The magnetic paths here intersect the coil windings 2b, 2d, respectively.

Thus, a rectangular voltage waveform is generated in the coil windings 2b, 2d by permitting the magnetic fluxes from the magnets 4a, 4b to enter the cores 3b, 3d and in turn intersect the coil windings 2b, 2d, when the rotor magnets are moved from the position shown in FIGS. 1 and 2 to the position shown in FIGS. 3 and 4 as the driving shaft 1 is rotated.

As described above, electric power is produced while the rotor magnets enter the cores and leave the same and one cycle of the rectangular voltage waveform is complete when the rotor magnets are rotated 180°. A temporal change in the magnetic fluxes in the above situation is gradual, exerting a little influence on the rotor. This allows both fractions of changes in the magnetic fluxes upon the rotor entering and leaving the cores to contribute to highly accurate generation of electric power, followed by smooth rotation of the rotor.

In particular, in the present embodiment the radial thickness of the magnets is much greater than that of the cores, the magnetic paths 10, 11 directly reach from the N pole of the one magnet to the pole S of the other magnet through the magnetic cores as described above, resulting in the magnetic paths being shortened and the magnetic fluxes being strengthened.

In accordance with the first embodiment, as described above, a minor loop of a hysteresis characteristic is employed by the same polarity induction generator to reduce hysteresis loss in iron for assurance of a generator of reduced magnetic repulsive force, and for assurance of highly stable and highly efficient electric power generation of reduced heat production followed by reduced driving torque.

Particularly, in the present embodiment, a very strong magnetic path can be established with the simplified arrangement compared with the prior generator which also utilizes the same polarity for power generation. The feature miniaturizes the size of the present generator compared with the prior same output generator, assuring applications in varieties of industrial fields.

In succession, a preferred embodiment in accordance with the second aspect of the present invention will be described with reference to FIGS. 7 through 12. The like reference nembers shall be applied to the same portions as those in the first embodiment.

Figure 7:
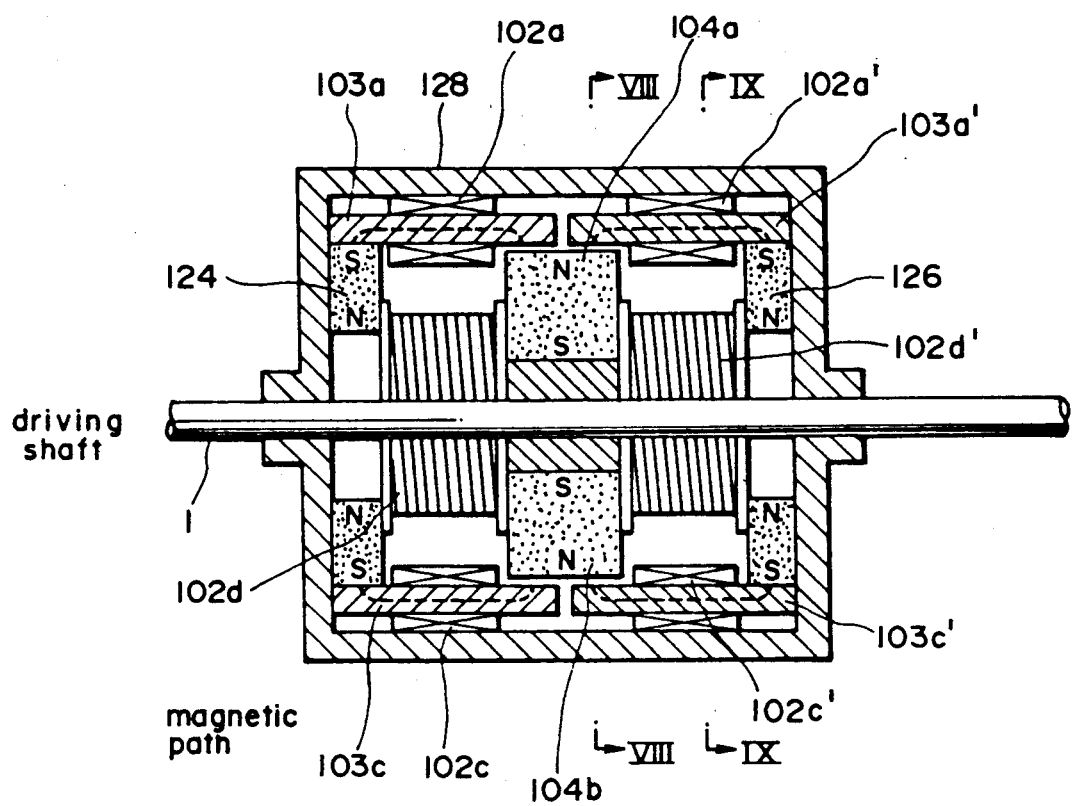
FIG. 7 is a side elevational view, taken longitudinally in part, illustrating a second preferred embodiment in accordance with another aspect of the present invention.
Figure 8:
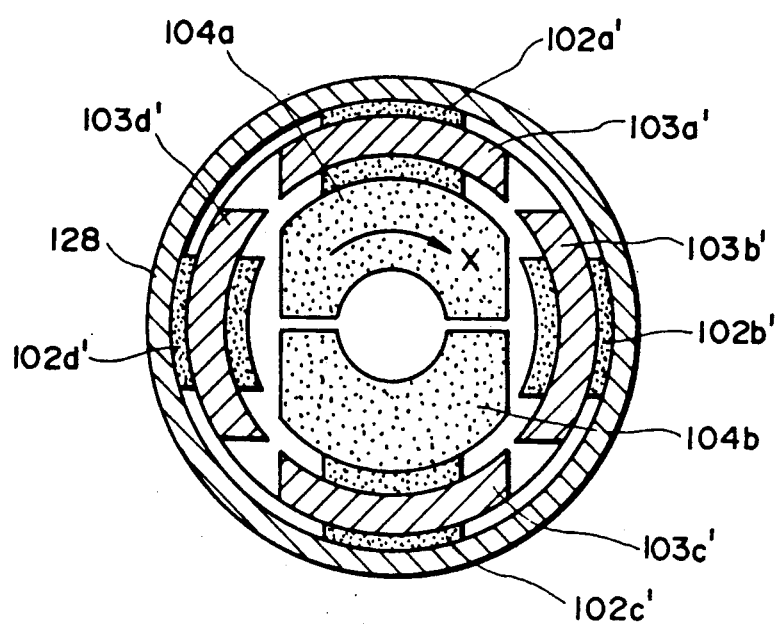
FIG. 8 is a cross sectional view taken along a line VIII—VIII in FIG. 7.
Figure 9:
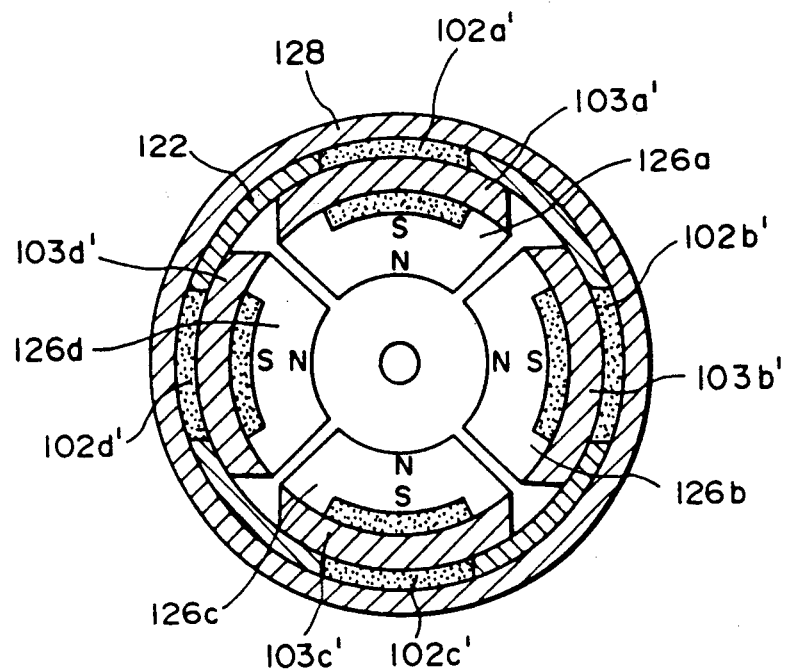
FIG. 9 is sectional view taken along a line IX—IX in FIG. 7.

Referring to FIGS. 7 through 9, an arrangement of the present embodiment is illustrated in a side elevational view.

As illustrated in the figures, a driving shaft 1 fixedly mounts thereon a pair of ferrite magnets 104a, 104b, both constituting a rotor, at the center thereof, the ferrite magnets 104a, 104b being circular arc-shaped along an outer circumference of the rotor over a mechanical angle of 90°, respectively, and face each other.

Figure 12:
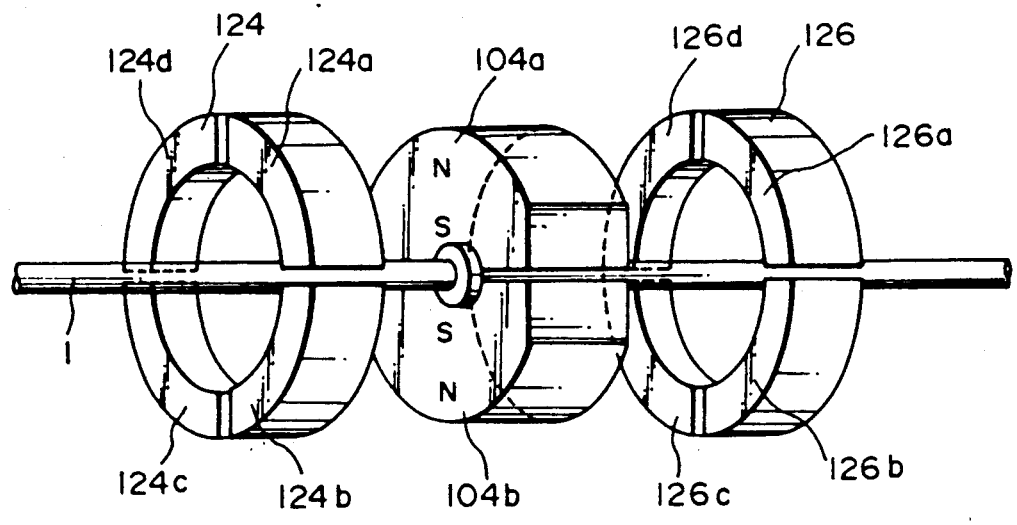
FIG. 12 is a perspective view illustrating rotating magnets and magnetic poles, etc., shown in FIGS. 7 and 8.

The driving shaft 1 further includes at both ends thereof ferrite magnets 124, 126 both fixedly mounted on a mounting frame 122. These ferrite magnets 124, 126 includes 124a, 124b, 124c, 124d, and 126a, 126b, 126c, 126d, all configured a ring shaped. Each set 124 or 126 of the sub-magnets arranges magnetic poles S, which are different from the poles N of the aforementioned magnets 104a, 104b, on the outer circumference thereof, as also illustrated in FIG. 12.

Magnetic cores 103a through 103d and 103a' through 103d', which are fixedly mounted on the non-magnetic mounting frame 122, have at the centers thereof cut-aways (not shown), around which coil windings 102a through 102d and 102a' through 102d' are wound and fixed thereon. Those magnetic cores 103a' through 103d' and 103a through 103d are adapted to have a mechanical angle of 90° and spaced away by a proper distance to each other.

An assembly composed as described above of the rotor, that is the pair of the ferrite magnets rotatably mounted on the driving shaft, the two ferrite magnets fixedly mounted on the mounting frame at both ends of the driving shaft, the right and left magnetic cores fixedly mounted on the mounting frame, and the coil windings is housed in a non-magnetic casing 128. The assembly assures a compact same polarity induction generator.

Operation of the second embodiment is as follows.

As illustrated in FIGS. 7 and 8, effluent magnetic fluxes from the magnetic poles N of the rotor magnets 104a, 104b reach the magnetic poles S of the stator magnets 126a, 126c through the cores 103a', 103c', and intersect the soils 102a', 102c', respectively.

Simultaneously, the effluent magnetic fluxes from the magnetic poles N of the magnets 104a, 104b reach the magnetic poles S of the stator magnets 124a, 124c, and intersect the coils 102a, 102c, respectively.

Figure 10:
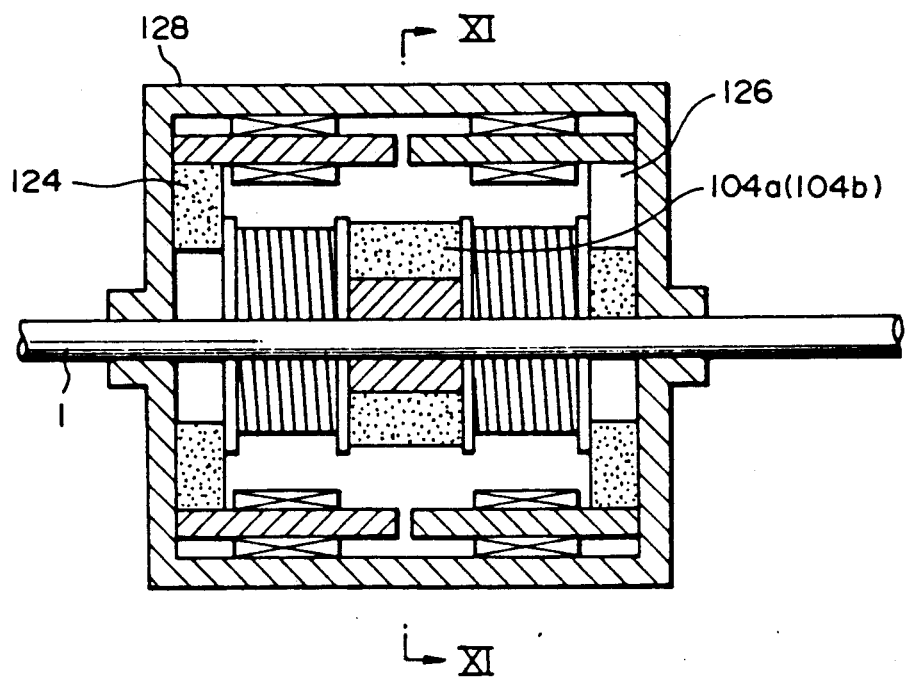
FIG. 10 is a side elevational view, cut away longitudinally in part, illustrating the second preferred embodiment of FIG. 7 which is here in another situation of operation.
Figure 11:
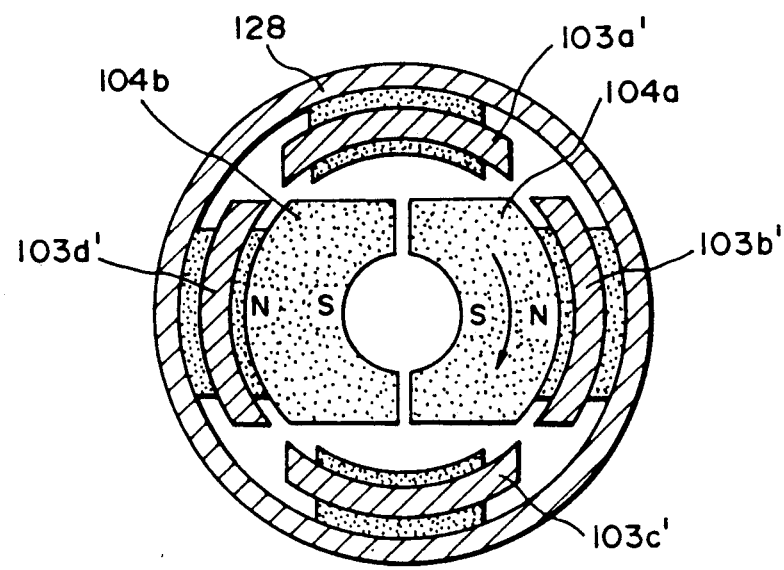
FIG. 11 is a cross sectional view taken along a line XI—XI in FIG. 10.

As the rotor is rotated in a direction of an arrow X in FIG. 8, the magnets 104a, 104b go out of the cores 103a', 103c', and go into the cores 103b', 103d' to a position illustrated in FIGS. 10 and 11.

It is accordingly understood that the magnetic fluxes from the poles N of the magnets 104a, 104b, which reach the poles S of the magnets 126b, 126d through the cores 103b', 103d', forms magnetic paths which intersect the coils 102b', 102d', respectively.

Similarly, the magnets 104a, 104b go out of the cores 103a, 103c, and go into the cores 103b, 103d. Hereby, the magnetic fluxes from the poles N of the magnets 104a, 104b reach the poles S of the magnets 124b, 124d through the cores 103b, 103d to form magnetic paths, which paths intersect the coils 102b, 102d, respectively.

Thus, a rectangular voltage is generated in the coils 102b, 102d, and 102b', 102d' by permitting the magnetic fluxes from the magnets 104a, 104b to enter the cores 103b, 103d, and 103b', 103d' and in turn intersect the coils 102b, 102d, and 102b', 102d', when the rotary magnets are moved from a situation shown in FIGS. 7 and 8 to a position shown in FIGS. 10 and 11 for example as the driving shaft 1 is rotated. As described above, electric power is produced whilst the magnets 104a, 104b enter the cores and leave the same, and one cylce is complete when the magnets are rotated 180°. A temporal change in the magnetic fluxes in the above situation is gradual, and exerts a little influence on the rotor. This allows both fractions of changes in the magnetic fluxes upon the rotor entering and leaving the cores to contribute to highly accurate generation of electric power, followed by smooth rotation of the rotor.

In the second embodiment, the mganetic paths directly reach from the pole N of the central magnet to the poles S of the magnets disposed at both ends through the magnetic cores as described above, resulting in the magnetic paths being shortened and the magnetic fluxes being made strengthened.

Particularly, in the second embodiment, there are formed simultaneously the two magnetic paths extending left and right from the central magnet, hereby assuring doubled electricity and hence powerful generation of electric power.

In accordance with the second embodiment, which embodies the second aspect of the present invention, as described above, a minor loop of a hysteresis characteristic induction generator to reduce hysteresis loss in iron loss for assurance of a generator of reduced magnetic repulsive force, and for assuracne of highly stable and highly efficient electric power generation of reduced heat production followed by reduced driving torque.

Further, in the present embodiment, a very dense magnetic path can be established with the simplified arrangement composed with the prior generators which also utilize the same polarity for electric power generation. In particular, the two magnetic paths are formed which directly reach from the central magnet to both right and left magnets. This assures doubled electricity generation and miniaturizes the size of the present generator compared with prior same output genertors, thus easing manufacture of such a generator and establishing many applications in varieties of industrial field.

Finally, a third preferred embodiment in accordance with the third aspect of the present invention will be described with reference to FIGS. 13 through 15.

Figure 13:
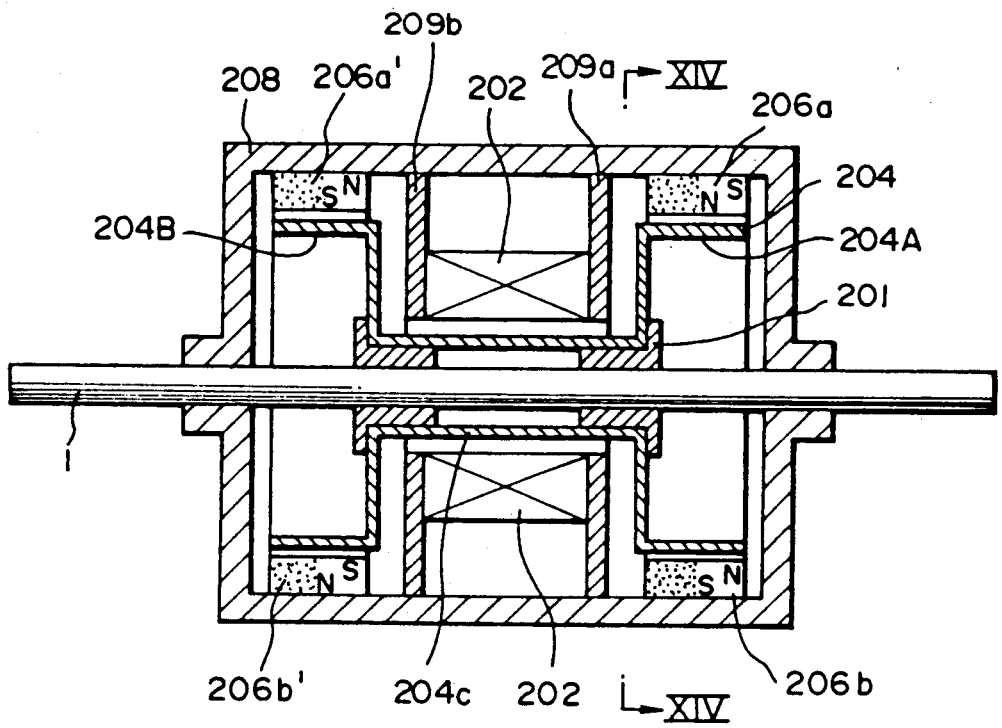
FIG. 13 is a side elevational view, cut away in part longitudinally, illustrating a third preferred embodiment in accordance with another aspect of the present invention.
Figure 14:
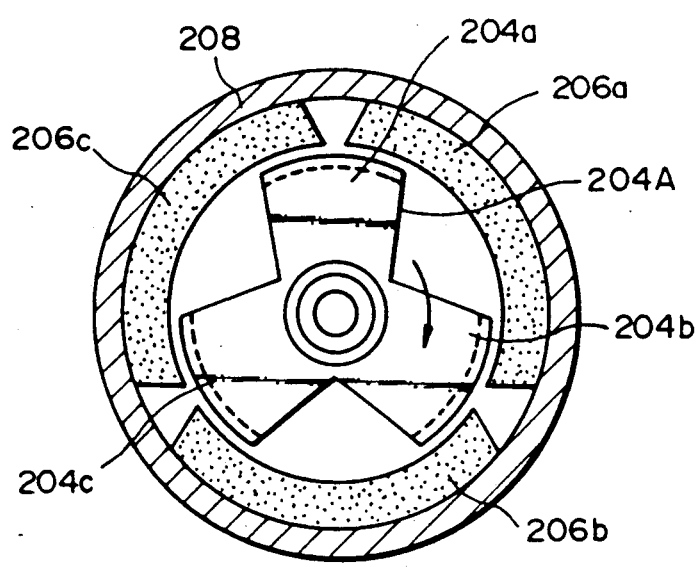
FIG. 14 is sectional view taken along a line XIV—XIV in FIG. 13.
Figure 15:
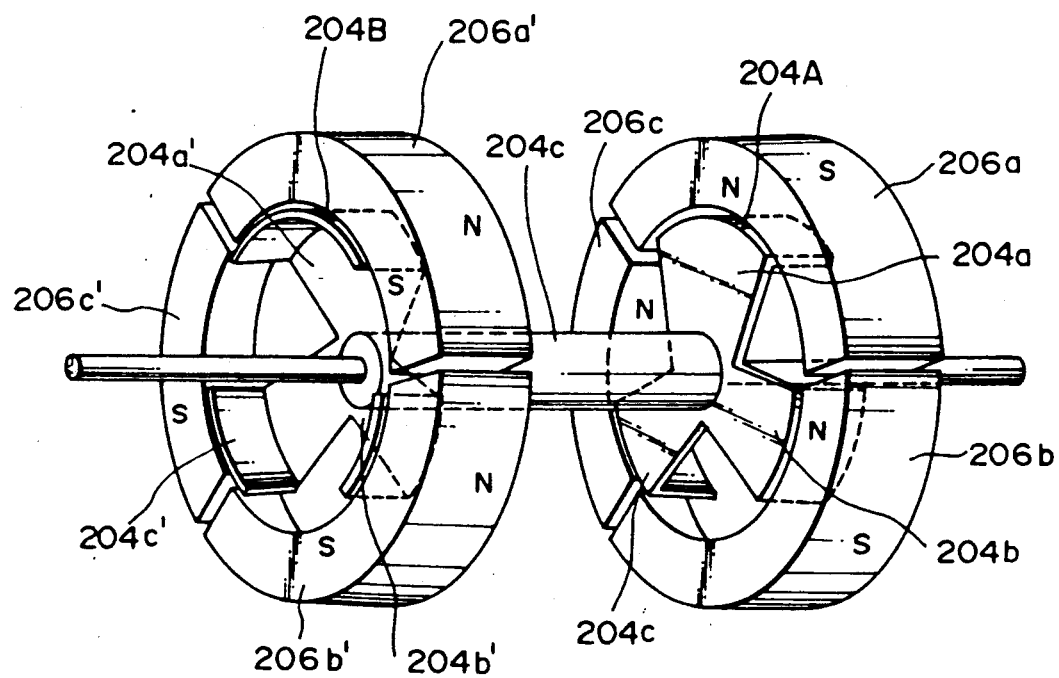
FIG. 15 is perspective view illustrating rotating magnets and magnetic poles, etc., shown in FIGS. 13 and 14.

Referring to FIGS. 13 and 14, an arrangement of the present embodiment is illustrated in a side elevational view cut away longitudinally.

As illustrated in the figures, a non-magnetic driving shaft 1 fixedly mounts thereon a rotor 204, which comprises a magnetic substance such as pure iron or silicon steel of several % through a non-magnetic bushing 201.

The rotor 204 includes vane members 204A, 204B at both ends thereof, each of which members has three magnetic vanes 204a, 204b, and 204c, both vane members 204A, 204B being connected to each other through a cylindrical magnetic member 204c.

The vane members 204A, 204B of the rotor 204 are disposed on the inside of fixed magnets 206a, 206b, 206c, and 206a', 206b', 206c' of a stator described later, outer peripheries of the vane members being located facing the fixed members. The rotor 204 can thus be rotated inside the stator.

Solenoid wirings 202 are wound around frames 209a, 209b attached to a casing 208 outside the rotor 204 coaxially with the driving shaft 1.

The magnets 206a through 206c and 206a' through 206c', which constitute the stator are fixedly mounted, facing each other, on the casing 208 as two sets of segments each located on the same circumferences at both ends of the generator.

The magnets 206a through 206c are magnetized such that the inner surface of the circumference have poles N while the outer surface of the same having poles S. The magnets 206'a through 206'c are magnetized such that the inner surface of the circumference have poles S while the outer surface of the same have poles N.

Although the segment, described above were spaced away at an angular interval of 120°, they may be arranged at a proper angle within a range of from 15° to 120°.

Operation of the third embodiment is as follows.

As illustrated in FIGS. 13 and 14, effluent magnetic fluxes from the magnetic poles N of the stator magnets 206a, 206b, 206c reach the magnetic poles S of the stator magnets 206a', 206b', 206c' through the vane member 204A, magnetic member 204C, and vane member 204B of the rotor 204, and intersect the solenoid wiring 202.

As the rotor is rotated interiorly of the stator in a direction of an arrow X in the figure, those magnetic fluxes are compressed and expanded in the respective gap parts 209 of the stator magnets 206a, 206b, 206c, and 206a', 206b', 206c' as illustrated in FIG. 14, and the changes in the magnetic fluxes cause the solenoid wiring to generate electric power effectively.

In accordance with the third embodiment, as described above, electric power is generated owing to the changes in the magnetic densities from the single poles N or S without utilizing the magnetic flux compression between the poles N and S in the prior cases. Additionally, a minor loop of a hysteresis characteristic is utilized to reduce hysteresis loss in iron loss, resulting in a reduced notch phenomenon, which was produced conventionally, and assuring highly effective power generator which is very stable and is less in heat production, followed by reduced driving torque.

Further, in the third embodiment, the rotor is made light-weight from a viewpoint of the structure of the generator, thus easing manufacture of such a generator although it is considerably large-sized and establishing many applicaions in varieties of industrial fields.

Although certain preferred embodiments have been shown and described, it should be understood that many changes and modifications may be made therein without departing from the scope of the appended claims.

What is claimed is:

1. A same polarity induction generator comprising:
   a casing having a rotary shaft supported at the center thereof and a non-magnetically permeable fixing frame mounted on an inner surface of the casing
   a plurality of physically and magnetically separate magnetic cores fixed to the fixing frame, the magnetic cores being circumferentially spaced from each other and extending through a predetermined angular distance;
   a rotor mounted on said rotary shaft and including two pairs of ferrite magnets, both ferrite magnets of each pair having the same magnetic poles located respectively adjacent and spaced outwardly from the rotary shaft, said pairs of said ferrite magnets being axially spaced from each other along said rotary shaft and arranged so that said magnetic poles are located oppositely in each said pair; and
   coil windings wound around each of the magnetic cores so as to interest magnetic fluxes induced in said magnetic cores by the ferrite magnets.

2. A same polarity induction generator according to claim 1, wherein said predetermined angular distance is approximately 90°.

3. A same polarity induction generator according to claim 1, wherein each said magnetic core extends axially between and axially overlaps said pairs of ferrite magnets, said coil windings being located between said pairs of ferrite magnets.

4. A same polarity induction generator according to claim 3, wherein said rotor includes a plastic spacer element carried on said rotary shaft, said spacer element having opposite axial ends which respectively abut said pairs of ferrite magnets.

5. A same polarity induction generator according to claim 3, wherein each of said magnets has a convex outer peripheral surface, each of said magnetic cores having a concave inner peripheral surface which is shaped so as to be complementary to said convex outer peripheral surfaces, said ferrite magnets and said magnetic cores having respective radial dimensions which permit said convex surfaces of said magnets to periodically move into closely radially adjacent relationship with each of said concave surfaces of said magnetic cores as said rotary shaft rotates.

6. A same polarity induction generator according to claim 5, wherein the radial thickness of said ferrite magnets is significantly larger than the radial thickness of said magnetic cores.

7. A same polarity induction generator according to claim 6, wherein each of said convex and concave surfaces has approximately the same circumferential dimension.

* * * * *